(12) United States Patent
Karrar et al.

(10) Patent No.: US 9,358,698 B2
(45) Date of Patent: Jun. 7, 2016

(54) POWER TOOL WITH AN INDICATOR

(75) Inventors: Carel Karrar, Stuttgart (DE);
Klaus-Martin Uhl, Plochingen (DE)

(73) Assignee: Andreas Stihl AG & Co. KG,
Waiblingen (DE)

( * ) Notice: Subject to any disclaimer, the term of this patent is extended or adjusted under 35 U.S.C. 154(b) by 403 days.

(21) Appl. No.: 13/021,790

(22) Filed: Feb. 7, 2011

(65) Prior Publication Data
US 2011/0197458 A1 Aug. 18, 2011

(30) Foreign Application Priority Data

Feb. 15, 2010 (DE) .................. 10 2010 008 102

(51) Int. Cl.
| | | |
|---|---|---|
| *B27B 17/02* | (2006.01) | |
| *B27B 17/00* | (2006.01) | |
| *B23D 59/00* | (2006.01) | |
| *B25F 5/02* | (2006.01) | |

(52) U.S. Cl.
CPC .......... *B27B 17/0025* (2013.01); *B23D 59/002* (2013.01); *B25F 5/021* (2013.01); *Y10T 83/855* (2015.04)

(58) Field of Classification Search
CPC ..... Y10T 83/855; B25F 5/021; B23D 59/002; B27B 17/0025
USPC ............ 30/388, 383, 522.15; 83/522.15, 520, 83/521; 33/202, 630
See application file for complete search history.

(56) References Cited

U.S. PATENT DOCUMENTS

| | | | | |
|---|---|---|---|---|
| 3,823,474 | A * | 7/1974 | Ionescu ........................... 30/383 |
| 4,319,404 | A * | 3/1982 | Brock ............................. 33/263 |
| 4,426,563 | A * | 1/1984 | Grogan .......................... 200/334 |
| 4,984,371 | A * | 1/1991 | Fredrickson .................... 33/263 |
| 5,249,362 | A * | 10/1993 | Harding ........................... 30/383 |
| 6,295,738 | B1 * | 10/2001 | Risch .............................. 33/700 |
| 6,616,295 | B2 * | 9/2003 | Sako et al. ..................... 362/119 |
| 6,939,022 | B2 * | 9/2005 | Brooks ........................... 362/120 |
| 7,185,998 | B2 * | 3/2007 | Oomori et al. ................. 362/119 |
| 8,186,067 | B2 * | 5/2012 | Onose et al. ..................... 30/377 |
| 2002/0054491 | A1 * | 5/2002 | Casas ............................. 362/119 |
| 2002/0069542 | A1 * | 6/2002 | Musacchia, Jr. ................ 33/286 |
| 2002/0131267 | A1 * | 9/2002 | Van Osenbruggen ........ 362/109 |
| 2005/0022393 | A1 * | 2/2005 | Donnerdal ....................... 30/383 |
| 2007/0017326 | A1 | 1/2007 | Long et al. |
| 2009/0013842 | A1 | 1/2009 | Rosskamp et al. |

FOREIGN PATENT DOCUMENTS

| | | |
|---|---|---|
| CN | 2744475 Y | 12/2005 |
| DE | 202004002210 U1 | 11/2004 |
| DE | 102004002747 A1 | 8/2005 |

* cited by examiner

Primary Examiner — Omar Flores Sanchez
(74) Attorney, Agent, or Firm — Gudrun E. Huckett

(57) ABSTRACT

A power tool is provided with an indicator with a light source for generating a marking. A holding device is secured on the power tool by positive fit. The indicator is releasably secured on the holding device, wherein the holding device is secured to a grip pipe. The holding device has a geometry that is matched to the geometry of the grip pipe such that the holding device is securable in only one position on the grip pipe.

13 Claims, 7 Drawing Sheets

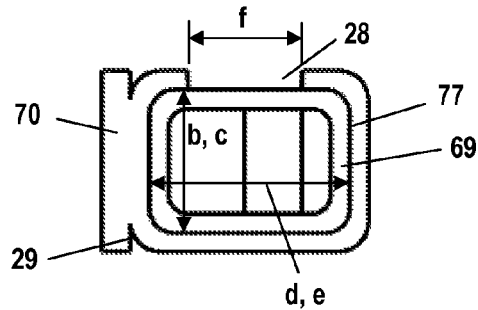
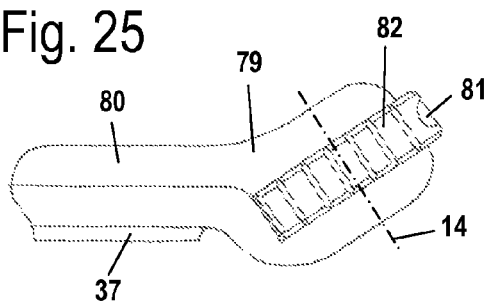
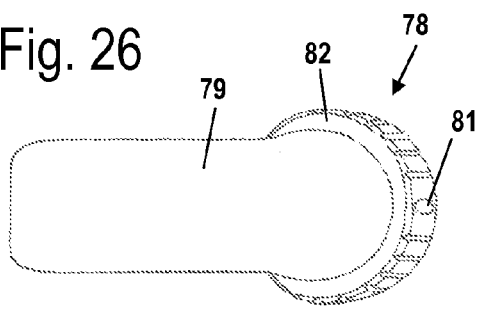
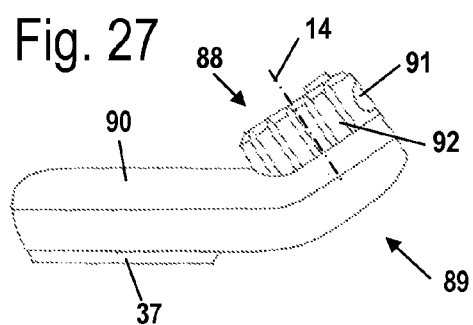
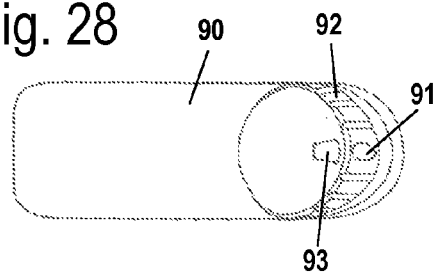
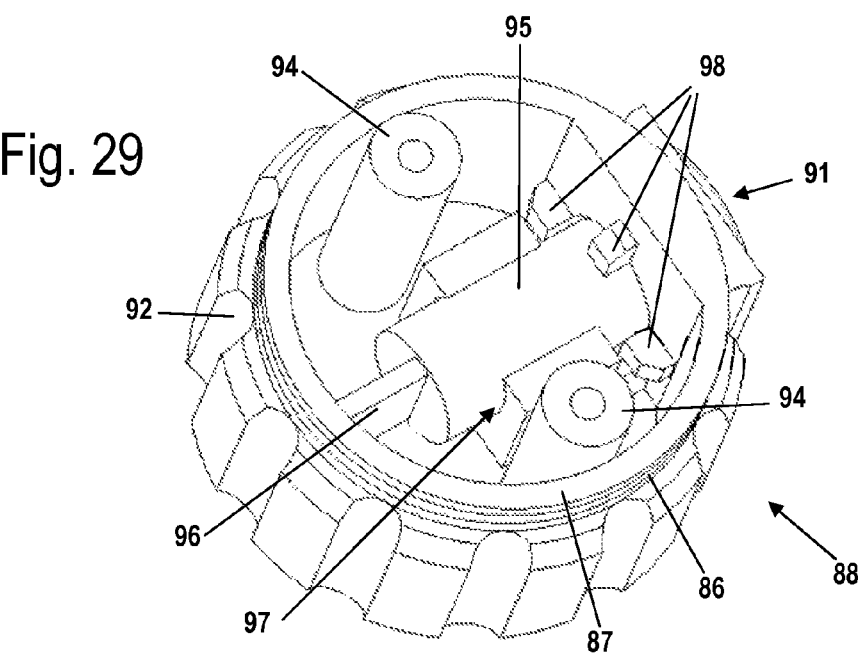

POWER TOOL WITH AN INDICATOR

BACKGROUND OF THE INVENTION

The invention relates to a power tool with an indicator that comprises a light source for generating a marking. A holding device is attached with positive fit to the power tool.

It is known in connection with power tools to have light sources, such as lasers or the like, for generating a marking. Such a power tool is disclosed, for example, in DE 20 2004 002 210 U1. In this power tool, the laser is arranged in a housing that can be secured laterally on the motor chainsaw by means of a guide. In order to be able to connect the laser disclosed in DE 20 2004 002 210 U1 to the motor chainsaw, the motor chainsaw must be provided with a special guide. The guide of the housing and the guide of the laser must be matched to each other.

SUMMARY OF THE INVENTION

It is an object of the present invention to provide a power tool with an indicator of the aforementioned kind that can be produced easily and that is versatile with respect to utilization.

In accordance with the present invention, this is achieved in that the indicator is detachably secured to the holding device.

Since the holding device is connected with positive fit to the power tool, the position of the holding device can be predetermined by constructive features so that wrong mounting—possible, for example, when attachment is done with clamping connectors or the like—can be avoided. Since the indicator is attached in a releasable way to the holding device, the indicator can be easily taken off in operation when it is not needed. It is possible to use a universal indicator with different holding devices that are matched to each power tool, respectively. In this way, an adaptation of the indicator to power tools of different configurations is enabled in a simple way.

Advantageously, the power tool comprises a grip pipe on which the holding device is attached with positive fit. In this way, advantageous positioning of the indicator and a versatile utilization are enabled. In particular, the geometry of the holding device and of the grip pipe are matched to each other such that the holding device can be secured in only one position on the grip pipe. For example, this can be realized in case of a grip pipe that is non-uniformly curved or bent by adaptation of the shape of the grip pipe receptacle to the course of the curved shape of the grip pipe. In this way, it is ensured that the marking has the right orientation. A simple constructive design results when the grip pipe has a recess that is engaged by the holding device for positive fit fixation. Such a recess is often already provided, for example, in connection with grip pipes of motor chainsaws for securing the coil spring as a damping element. A projection of the grip pipe may also be used alternatively or additionally for positive fit fixation.

In order to predetermine constructively the rotational position of the holding device on the grip pipe, it is in particular provided that the grip pipe has a cross-sectional shape that deviates from a circular shape and that the holding device has a grip pipe receptacle whose cross-sectional shape is matched to the cross-sectional shape of the grip pipe. A simple configuration of the holding device and a simple installation of the holding device on the grip pipe are provided when the grip pipe receptacle has an opening having a width matched approximately to the smallest diameter of the grip pipe. By means of the opening the holding device can be pushed onto the grip pipe. For fixation on the grip pipe, the holding device can then be rotated about its longitudinal axis such that the holding device engages or locks on the grip pipe in the area of the greatest diameter of the grip pipe. For an approximately oval cross-sectional shape of the grip pipe this is achieved by a rotation about approximately 90 degrees.

Advantageously, the indicator is detachably or releasably connected to the holding device by means of a snap-on connection. In order to facilitate removal of the indicator, advantageously an actuating device for releasing the snap-on connection is provided. Advantageously, the holding device has a guide onto which the indicator is pushed. By this type of fixation of the indicator on the holding device the position of the indicator on the holding device is predetermined by constructive features.

Advantageously, the indicator has an adjusting device for adjustment of the marking. When felling trees by means of a motor chainsaw, the indicator can be used for indicating the felling direction. As a result of the adjustability of the marking it is possible to take a bearing of the felling direction across certain distances. When using the marking, for example, for cutting to length a tree trunk by means of a motor chainsaw, the indicator, as a result of the adjustability, can be used as a measuring device.

Advantageously, the indicator has a linear or line laser, i.e., a laser that generates a linear marking (line marking), i.e., a marking having the shape of a straight line. By means of a line marking, taking a bearing of the felling direction is easily possible when using the indicator as a felling direction indicator. Advantageously, the power tool is a motor chainsaw and the line marking is positioned in a plane that is perpendicular to the plane of the guidebar of the motor chainsaw and perpendicular to the bottom side of the motor chainsaw. The bottom side of the motor chainsaw is the side of the motor chainsaw that will rest on the ground when putting down the saw. When the motor chainsaw is turned off, the bottom side of the motor chainsaw is parallel to the ground. The bottom side of the motor chainsaw can also be defined by individual contact points of the grip housing or the like. By means of the indicated orientation of the line marking, the marking, when placing the motor chainsaw on the tree for felling a tree, is oriented in the felling direction of the tree trunk. In this connection, only a lateral displacement between the guidebar and the indicator must be taken into consideration. When positioning the bottom side of the motor chainsaw on a tree trunk to be cut to length, with an appropriate adjustment of the endpoint of the line marking it is possible to measure a desired length.

Advantageously, the motor chainsaw has a gun sight and the plane in which the line marking extends is parallel to the gun sight. In particular, the plane in which the line marking is positioned has a spacing to the gun sight that is smaller than approximately 5 cm. The spacing is advantageously smaller than approximately 2.5 cm. For cutting to length, the motor chainsaw can thus be placed on the tree trunk to be cut to length such that the gun sight approximately intercepts the longitudinal center axis of the tree trunk. In this way, a proper positioning of the motor chainsaw can be ensured in a simple way. A precise measurement is enabled. Since the spacing of the gun sight to the plane in which the marking is located is minimal, only a small measuring error results because of the displacement. An especially precise measurement is achieved when the gun sight is positioned in the plane in which also the line marking is located. Because of this, a raised position of the indicator may however result due to the grip pipe geometry. In order to protect the indicator from becoming damaged, a spacing relative to the plane of the marking may therefore be acceptable because in this way a protected position of the indicator is enabled.

In order to enable a satisfactory indication in particular for a cutting-to-length action, the line laser is advantageously adjustable such that the spacing of an end point of the marking to the plane of the guidebar is adjustable at least from approximately 20 cm to approximately 110 cm. The marking should be located within the plane of the bottom side of the motor chainsaw, i.e., at the level where the motor chainsaw can be placed against a tree trunk. The end point of the marking with which measurements are carried out can be the end point that is facing the motor chainsaw or the end point that is facing away from the motor chainsaw.

A simple configuration results when the line laser has a laser diode and when the indicator has a housing in which the laser diode is rotatably supported for adjustment of the linear or line marking. The axis of rotation of the laser diode extends in particular parallel to the longitudinal center axis of the guidebar. Because of this position of the axis of rotation the orientation of the line marking is maintained during adjustment and the line marking is positioned always in the plane that is perpendicular to the plane of the guidebar and perpendicular to the bottom side of the motor chainsaw. Advantageously, the housing has a slot-shaped window through which the laser diode will shine its light for producing the marking. In particular, the indicator has an adjusting device for the laser diode. A simple configuration results when the laser diode is integrated into the adjusting device.

BRIEF DESCRIPTION OF THE DRAWING

FIG. 24 is a schematic section illustration along the section line XXIV-XXIV of FIG. 22.

FIG. 25 is a side view of an embodiment of an indicator.

FIG. 26 is a plan view onto the indicator of FIG. 25.

FIG. 27 is a plan view onto an embodiment of an indicator.

FIG. 28 is a plan view onto the indicator of FIG. 27.

FIG. 29 is a perspective illustration of the adjusting device of the indicator of FIGS. 27 and 28.

DESCRIPTION OF THE PREFERRED EMBODIMENTS

Figure 1:
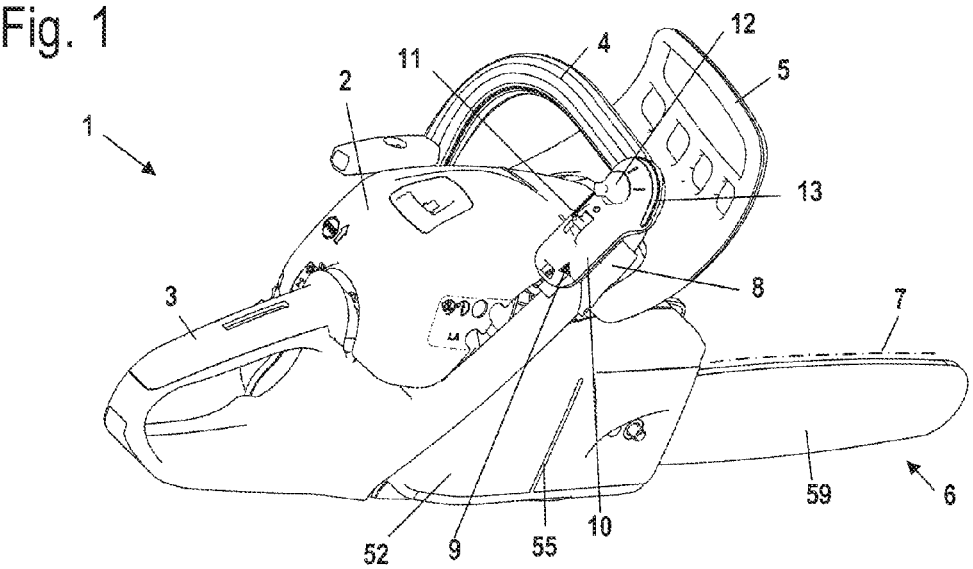
FIG. 1 is a perspective illustration of a motor chainsaw.

FIG. 1 shows a motor chainsaw 1 as an embodiment of a hand-held power tool. The motor chainsaw 1 has a housing 2 on which a rear handle 3 is secured. On the rear handle 3 there is usually a throttle lever provided that is not illustrated in the drawings. A grip pipe 4 spans the housing 2. On the side of the housing 2 that is opposite the rear handle 3, a guidebar 6 projects forwardly. A saw chain 7 indicated in FIG. 1 in dashed lines is driven in circulation about the guidebar 6. The guidebar 6 which is of a planar configuration is positioned in an imaginary plane 59. In the area between the grip pipe 4 and the guidebar 6 there is a hand guard 5 that serves for triggering a chain brake. On the housing 2 a chain wheel cover 52 is secured that supports a gun sight 55 that is configured as a color marking and/or as a projection or a depression. The gun sight 55 serves for taking a bearing of the felling direction when felling trees. The gun sight 55 is advantageously provided not only on the chain wheel cover 52 but also substantially extends all around the motor chainsaw 1 and extends also on the topside and on the side of the housing 2 that is opposite the chain wheel cover 52. The gun sight 55 defines a felling plane 68 (FIG. 2).

On the grip pipe 4 there is an indicator 9. The indicator 9 is secured on the grip pipe 4 by means of a holding device 8 that is matched to the geometry of the grip pipe 4 and that can be secured only in this position on the grip pipe 4. The holding device 8 is held with positive fit on the grip pipe 4. On the holding device 8 the indicator 9 is also secured with positive fit and in a detachable (releasable) way. The indicator 9 comprises a housing 10 with an on/off switch 11 and with a turn knob 12 by means of which the position of a line laser 15 (FIG. 18) arranged in housing 10 can be adjusted. The housing 10 has also a slot-shaped window 13 through which the light emitted by the line laser 15 can exit.

Figure 2:
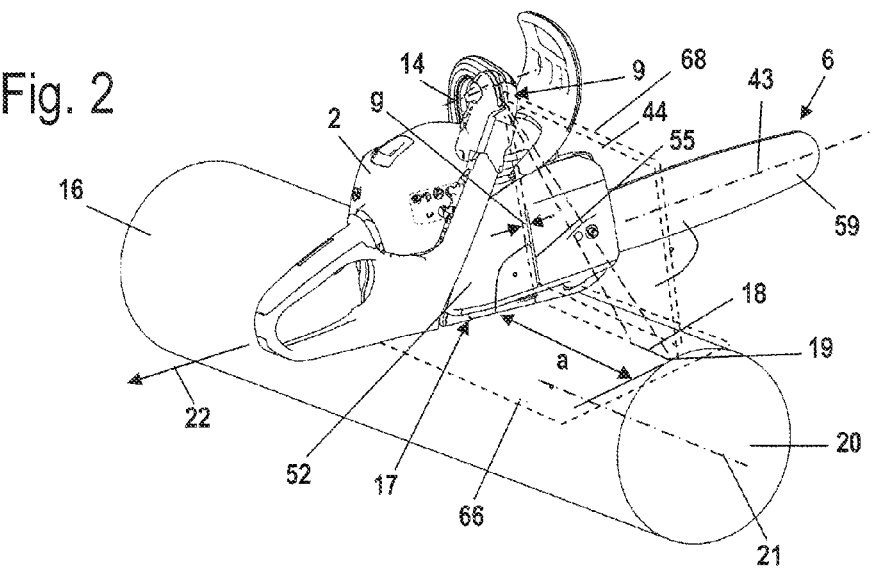
FIG. 2 is a perspective illustration of the motor chainsaw of FIG. 1 when measuring a tree trunk to be cut to length.
Figure 3:
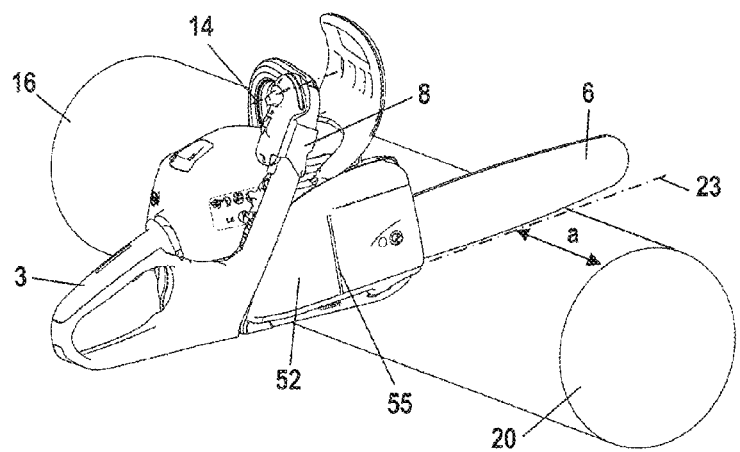
FIG. 3 shows the motor chainsaw of FIG. 2 in the position for cutting the tree trunk to the desired length.

FIGS. 2 and 3 show the use of the indicator 9 when cutting to length a tree trunk 16 that is only schematically indicated. First, the motor chainsaw 1, as shown in FIG. 2, is placed with its bottom side 17 onto the tree trunk 16. The guidebar 6 in this position is oriented vertically and projects forwardly. The section of the gun sight 55 arranged on the chain wheel cover 52 is oriented radially relative to the longitudinal axis 21 of the tree trunk 16 so that the extension of the gun sight 55 intercepts the longitudinal axis 21. The gun sight 55 spans a felling plane 68 that, in the illustrated arrangement of the motor chainsaw 1, is parallel to the longitudinal axis 21. Advantageously, the longitudinal axis 21 lies within the felling plane. The indicator 9 generates a line-shaped marking 18 that is aligned approximately parallel to the longitudinal axis 21 of the tree trunk 16. For cutting off a desired length from the tree trunk 16, the end point 19 of the marking 18 is positioned at the end face 20 of the tree trunk 16 so that the end point 19 relative to the plane 59 of the guidebar 6 has a spacing a that corresponds to the desired length. In the illustrated embodiment, the spacing a is measured relative to the end point 19 of the marking 18 that is facing away from the motor chainsaw 1. However, the end point of the marking 18 that is facing the motor chainsaw can be used for measurement also.

The spacing a is measured on the topside of the tree trunk 16 in a plane 66 in which the bottom side 17 of the motor chainsaw 1 is positioned and that extends tangentially to the tree trunk 16. For adjusting the desired length, the laser that generates the marking 18 is supported so as to be rotatable within the housing 10 of the indicator 9 about axis of rotation 14. The laser is rotatable such that the spacing a is adjustable at least from approximately 20 cm to approximately 110 cm. The axis of rotation 14 is positioned parallel to the longitudinal center axis 43 of the guidebar 6. As shown in FIG. 2, the linear or line marking 18 is arranged in an imaginary plane 44 that extends transverse to the motor chainsaw 1. The plane 44 perpendicularly intersects the plane in which the guidebar 6 is positioned. The plane 44 is also perpendicular to the bottom side 17 of the motor chainsaw 1 and to the imaginary plane 66 that is defined by the bottom side 17. When adjusting the laser, the marking 18 moves within the plane 44. The orientation of the line-shaped marking 18 that is perpendicular to the guidebar 6 is maintained as a result of position of the axis of rotation 14.

The plane 44 has a spacing g relative to the felling plane 68 that is defined by the gun sight 55. The spacing g is advantageously less than 5 cm, in particular less than 2.5 cm. It has been found to be particularly advantageous when the spacing g is approximately 0.5 cm to approximately 2 cm. However, it may also be provided that the gun sight 55 is located within the plane 44. By means of the spacing g a minimal measuring error results. As a result of the spacing g, the indicator 9 can however be arranged farther down the grip pipe 4. In this way, the grip pipe 4 can protect the indicator 9 better from damage.

The indicator 9 is arranged at the top part of the section of the grip pipe 4 that extends at a slant forwardly and upwardly. As a result of the extension of the grip pipe 4 in this area, the spacing g of the gun sight 55 relative to the plane 44 becomes larger the farther down the indicator 9 is arranged on the grip pipe 4. The indicator 9 is arranged laterally relative to the housing 2 approximately in the area of the topside of the housing 2 and approximately perpendicularly above the chain wheel cover 52.

In order to cut a section of the desired length from the tree trunk 16, the motor chainsaw 1, as illustrated in FIG. 3, is moved in the direction toward the rear handle 3 toward the rear. This is illustrated in FIG. 2 by arrow 22. The motor chainsaw 1 is pulled to the rear until the guidebar 6 rests on the tree trunk 16. Then a section of the tree trunk 16 is cut to length at the cutting line 23. Since the motor chainsaw 1 has been pulled to the rear, in a simple way the spacing to the end face 20 can be maintained. Since the guidebar 6 does not first contact with its tip the tree trunk 16, the danger of kickback is reduced. In known devices for cutting to length a tree trunk, the tip of the guidebar is placed against the tree and the laser generates a light spot or a line that extends perpendicularly to the longitudinal axis 21 of the tree trunk 16. When the guidebar 6 of the motor chainsaw 1 in case of such cutting-to-length devices is not aligned exactly perpendicularly to the tree trunk 16, a comparatively large error of the measured length results. This error can be avoided in case of the inventive arrangement of the indicator 9 on the grip pipe 4 and the orientation of the line marking 18 in the direction of the longitudinal axis 21 of the tree trunk 16 and approximately at the level of the gun sight 55 so that a greater measuring precision is achieved.

Figure 4:
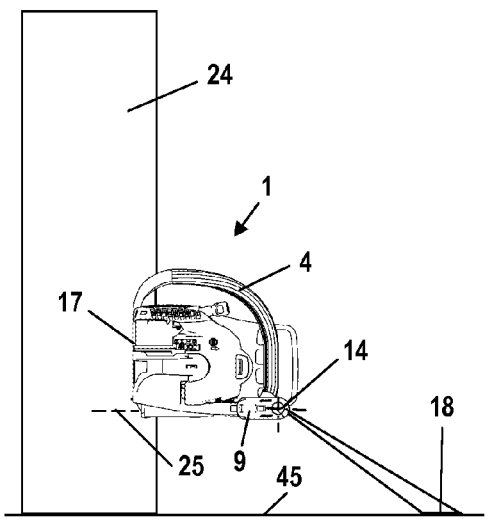
FIG. 4 is a view from behind onto a motor chainsaw when taking a bearing of the felling direction before carrying out the bottom cut of a V notch.
Figure 5:
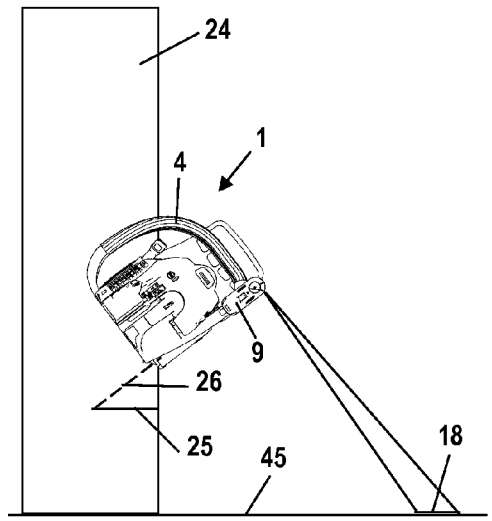
FIG. 5 shows the motor chainsaw of FIG. 4 before carrying out the top cut of the V notch.
Figure 6:
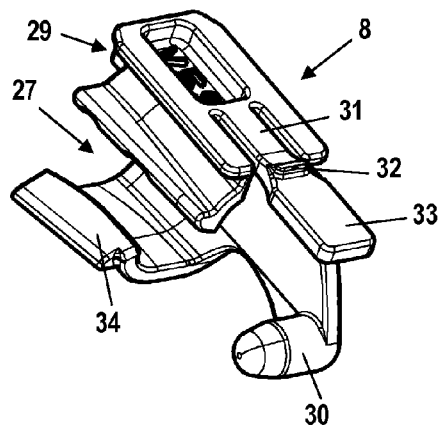
FIG. 6 is a perspective illustration of the holding device of the indicator.
Figure 7:
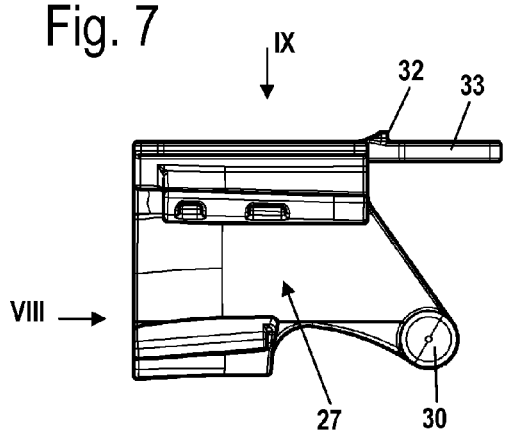
FIG. 7 is a side view of the holding device of FIG. 6.
Figure 8:
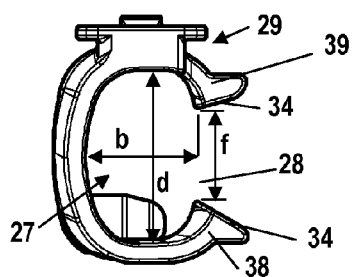
FIG. 8 is aside view of the holding device of FIG. 7 in the direction of arrow VIII of FIG. 7.
Figure 9:
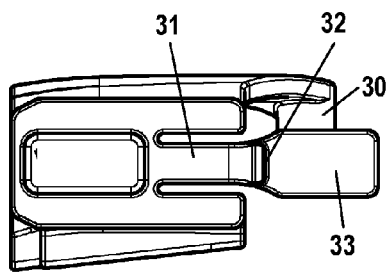
FIG. 9 is side view of the holding device in the direction of the arrow IX a FIG. 7.

In FIG. 4 and FIG. 5 the use of the indicator 9 when felling a tree is illustrated. FIG. 4 shows the motor chainsaw 1 with the guidebar 6 placed against the tree trunk 24. The guidebar 6 is hidden in FIG. 4 by the housing 2 of the motor chainsaw 1. The bottom side 17 of the housing 2 is facing the tree trunk 24. The guidebar 6 is positioned for carrying out the bottom cut 25 of the V notch indicated in dashed lines in FIG. 4. The indicator 9 generates on the ground 45 a line-shaped marking 18 that indicates the felling direction of the tree trunk 24 to be wt.

For carrying out the top cut 26, the motor chainsaw 1, as shown in FIG. 5, is pivoted. The guide bar 6 is positioned at a slant against the tree trunk 24 and is also hidden in this view of FIG. 5 by the housing 2 of the motor chainsaw 1. In order to indicate the line marking 18 at a suitable spacing, the line laser in the housing of the indicator 9 has been pivoted about axis of rotation 14 in the direction toward the ground 45 so that the pivoting action of the motor chainsaw 1 is compensated. When performing the top cut 26, the line-shaped marking 18 is also pointing in the direction in which the tree trunk 24 will fall.

Figure 10:
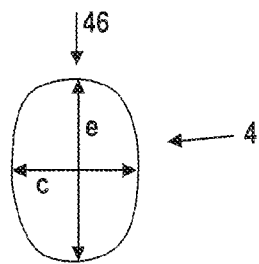
FIG. 10 is a schematic section illustration of the grip pipe of the motor chainsaw.

FIGS. 6 to 9 show details of the holding device 8 with which the indicator 9 is secured on the grip pipe 4. The holding device 8 has a grip pipe receptacle 27 whose cross-section is matched to the cross-section of the grip pipe 4. The holding device 8 in this area is approximately C-shaped and has two arms 38, 39 that delimit an opening 28 of a grip pipe receptacle 27. The arms 38, 39 are advantageously embodied to be somewhat springy and are provided with insertion ramps 34 for the grip pipe 4. The opening 28 has a width f that corresponds advantageously approximately to the width c of the grip pipe 4 indicated in FIG. 10. In this connection, the width c is measured at the smallest diameter of the approximately oval-shaped grip pipe 4. The width b of the receptacle 27 also corresponds advantageously approximately to the width c of the grip pipe 4. The receptacle 27 has a height d that is significantly greater than the width f of the opening 28 and that advantageously approximately matches the height e of the grip pipe 4 (FIG. 10).

For fixation of the indicator 9 the holding device 8 has a guide 29 that is embodied as a longitudinal guide. On the side of the holding device 8 that is facing the indicator 9, a spring stay 31 is arranged on the holding device 8 that has a locking nose 32 for locking on the housing 10 of the indicator 9. As an extension of the spring stay 31 an actuation device in the form of actuating section 33 is provided by means of which the locking nose 32 can be released. When the indicator 9 is mounted on the holding device 8, the actuation section 33 projects slightly from below the housing 10 of the indicator 9 and is therefore easily accessible. As shown in the FIGS., the holding device 8 has a pin 30 that laterally projects into the area of the grip pipe 4 from the side that is approximately opposite the opening 28.

Figure 11:
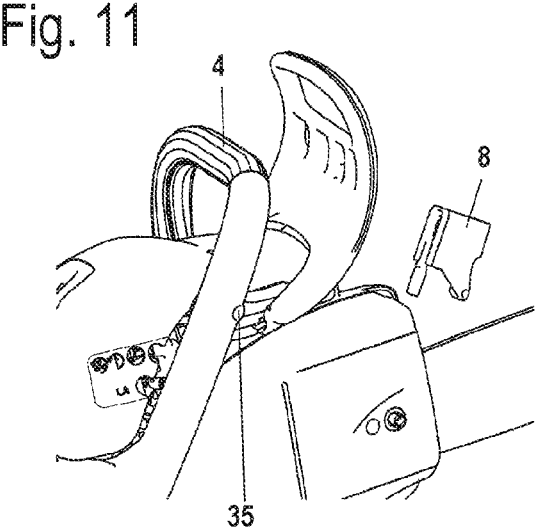
FIG. 11 is a perspective view of the motor chainsaw for illustrating the first step of attaching the holding device and the indicator.
Figure 12:
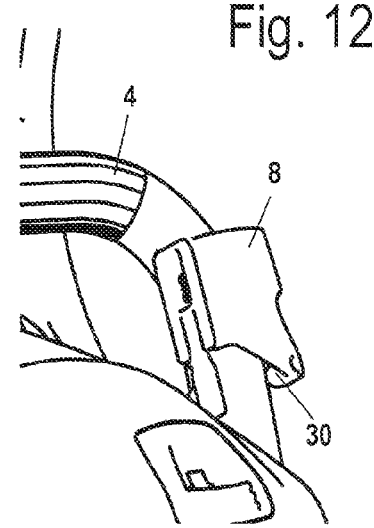
FIG. 12 is a perspective detail view illustrating a second step of mounting the holding device.

FIGS. 11 to 16 show mounting of the holding device 8 and of the indicator 9 on the grip pipe 4. As shown in FIG. 11, the grip pipe 4 has a recess 35 in the area where the holding device 8 is to be mounted. As shown in FIG. 12, the holding device 8 is first placed onto the grip pipe 4. When doing so, the holding device 8 is pushed with the opening 28 (FIG. 8) in the direction indicated by arrow 46 in FIG. 10, i.e., across the narrow side of the grip pipe 4, onto the grip pipe 4. The holding device 8 is pushed across the smallest diameter of the grip pipe 4. FIG. 12 shows the holding device 8 positioned on the grip pipe 4.

Figure 13:
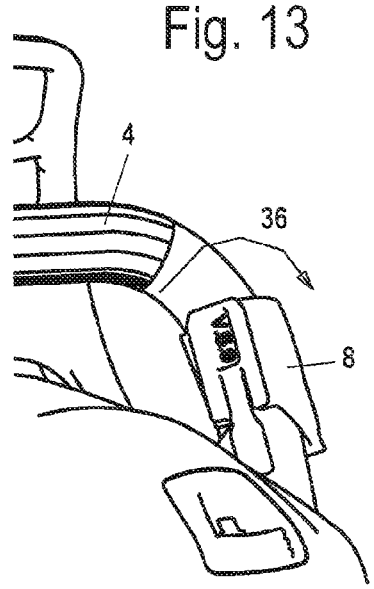
FIG. 13 is a perspective detail view illustrating a third step of mounting of the holding device.
Figure 14:
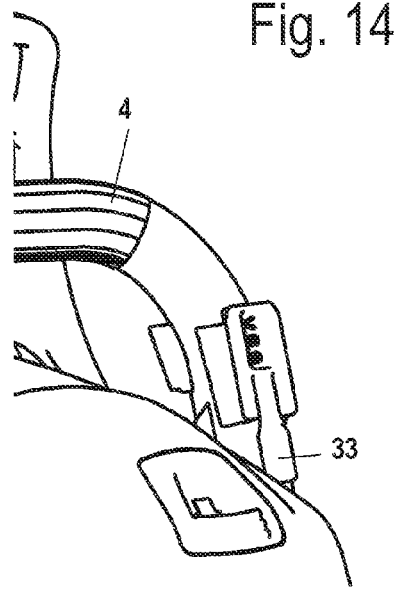
FIG. 14 is a perspective detail view illustrating a fourth step of mounting of the holding device.
Figure 15:
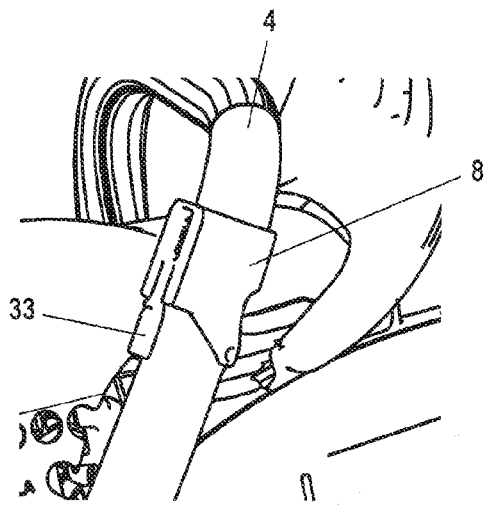
FIG. 15 is a perspective detail view illustrating a fifth step of mounting of the holding device.
Figure 16:
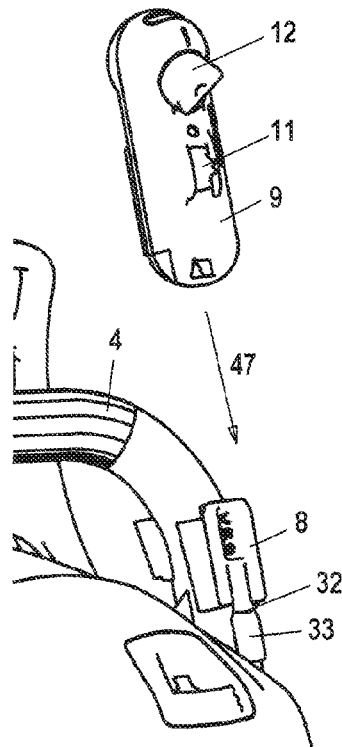
FIG. 16 is a perspective detail view illustrating the sixth step of attaching the indicator to the mounted holding device.

Subsequently, the holding device 8, as indicated in FIG. 13 by arrow 36, is rotated about its longitudinal axis by approximately 90 degrees until the grip pipe 4 is approximately congruent with the recess cross-section of the grip pipe receptacle 27. This position is illustrated in FIGS. 14 and 15. In this position, the pin 30 is arranged in the recess 35. By rotation in the direction of arrow 36 in FIG. 13, the pin 30 is rotated into the recess 35. Subsequently, as shown in FIG. 16, the indicator 9 is pushed in direction of arrow 47 from above onto the holding device 8. As soon as the locking nose 32 locks on the indicator 9, the indicator 9 is fixedly connected to the motor chainsaw 1.

The holding device 8 is designed such that it can be arranged only in the predetermined position on the grip pipe 4. As a result of the curvature of the grip pipe 4 and the length of the holding device 8 only one predetermined position of the holding device 8 is possible which position is the one where the curvature or bend of the grip pipe receptacle 27 coincides with the curvature or bend of the grip pipe 4. A further predetermination of the position of the holding device 8 is achieved by the pin 30 and the recess 35. They can be provided additionally or alternatively to the predetermination of the position by means of the curvature or bend of the grip pipe 4. Also, other constructive features may be utilized for predetermining the position of the holding device 8 on the grip pipe 4.

Figure 17:
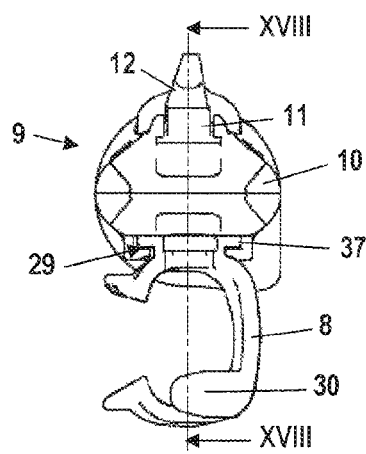
FIG. 17 is a side view of the indicator with holding device.
Figure 18:
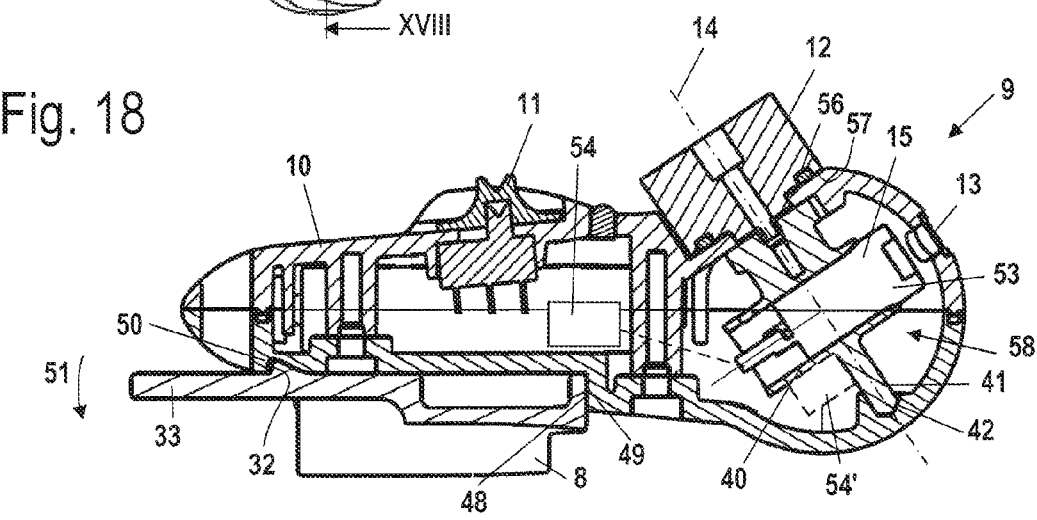
FIG. 18 is a section illustration along the section line XVIII-XXIII of FIG. 17.

FIG. 17 and FIG. 18 show the holding device 8 and the indicator 9 in detail. FIG. 17 shows that the housing 10 of the indicator 9 has a receptacle 37 for the guide 29. FIG. 18 shows that the indicator 9 is pushed onto the guide 29 until the leading edge 48 of the holding device 8 hits a projection 49 of the housing 10 and the locking nose 32 locks behind locking edge 50 on the housing 10. In this way, the indicator 9 is secured safely on the holding device 8. For releasing the indicator 9 the actuating section 33 is pushed in direction of arrow 51 downwardly until the locking nose 32 is released from behind the locking edge 50. Now the indicator 9 can be removed in a direction opposite to the direction of arrow 47 in FIG. 16 in the upward direction.

FIG. 18 shows that for producing the line marking 18 a line laser 15 is arranged in the housing 10 of the indicator 9. The line laser 15 comprises a laser diode 53 that is supported in the housing 10 so as to be pivotable by adjusting device 58. It comprises also a control unit 54 that is indicated schematically in FIG. 18 and is stationarily arranged in the housing 10. Instead of a control unit 54 also a control unit 54' can be provided which is pivotably supported. The laser diode 53 is arranged in a holder 40 that has a bearing pin 41 projecting into a receptacle 42 of the housing 10. The laser diode 53 is thus integrated into the adjusting device 58. On the holder 40, the control unit 54' can be secured. The end of the holder 40 opposite the pin 41 is fixedly connected to the turn knob 12 and is therefore also supported. The line laser 15 is oriented such that the laser beam will exit through the window 13 outwardly. The support of the laser diode 53 is designed to be self-locking so that in operation no undesirable movement as a result of vibrations or the like will occur. For this purpose, the turn knob 12 has on its underside 57 facing the housing 10 a sealing ring 56 that rests against the housing 10 and secures the laser diode 53 by friction in the adjusted position. Alternatively, also constructively predetermined locking positions can be provided for positioning the laser diode 53.

In order to be able to use the indicator 9 in different power tools, it is provided that for each power tool type, for example, for motor chainsaws of different build, a holding device 8 is provided that is matched to the particular motor chainsaw. Each holding device 8 has the same guide 29 so that on any type of holding device 8 the same indicator 9 can be secured. In this way, the expenditure for providing indicators for different power tools is significantly reduced. Because of the positive fit arrangement of the holding device 8 of the grip pipe 4 and the configuration in such a way that only one position of the holding device 8 is possible on the grip pipe 4, it can be ensured that the line marking 18 is arranged in the proper orientation or alignment.

Figure 19:
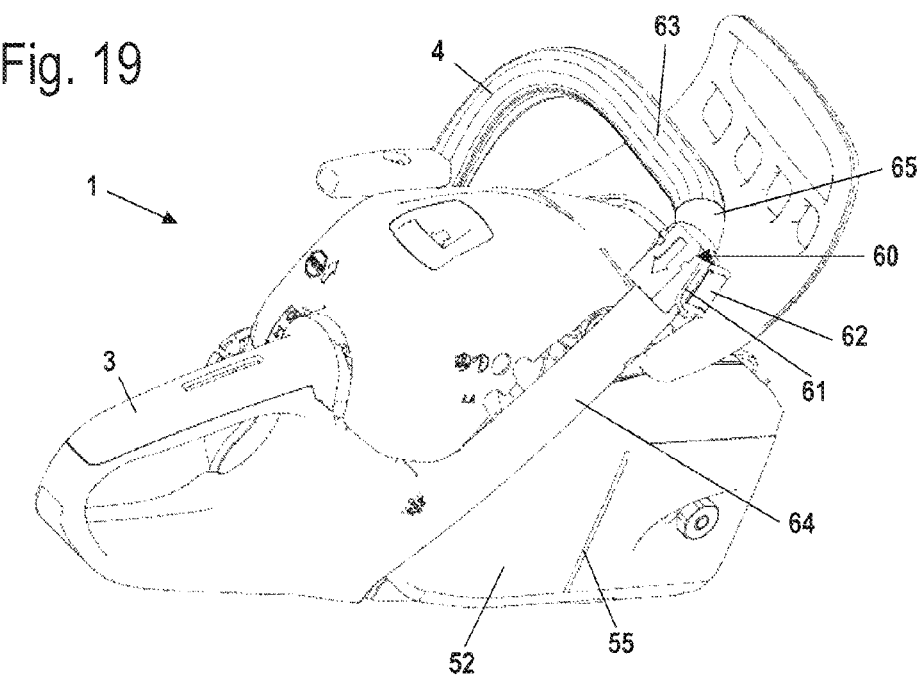
FIG. 19 is a perspective illustration of the motor chainsaw.
Figure 20:
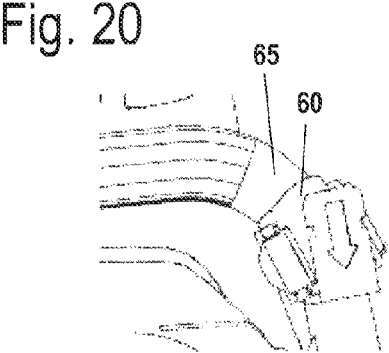
FIG. 20 is a detail illustration of the holding device arranged on the grip pipe of the motor chainsaw of FIG. 19.
Figure 21:
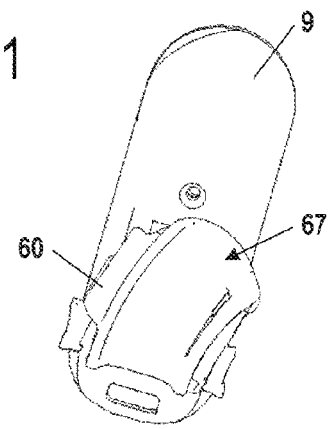
FIG. 21 is a perspective illustration of the holding device with the indicator in a view from below.

FIGS. 19 to 21 show an embodiment of a holding device 60. FIG. 19 shows that the grip pipe 4 has an approximately horizontally extending section 63 and a section 64 that projects at a slant forwardly and substantially extends vertically. Between the two sections 63 and 64 there extends a bend 65 of the grip pipe 4. The holding device 60 is arranged in the area of the bend 65. As shown in FIG. 19, the holding device 60 has for fixation on the grip pipe 4 at least one bracket 61 that can be tightened or clamped by means of a tightening lever 62 that is embodied as an eccentric lever. The bracket 61 and the tightening lever 62 serve however only for fixation of the holding device 60. The correct position of the holding device 60 results from the bend 65 of the grip pipe 4. The holding device 60 has a grip pipe receptacle 67 (FIG. 21) whose extension is matched to the extension of the bend 65 of the grip pipe 4. In this way, the holding device 60 can be arranged only in a constructively predetermined position on the grip pipe 4. As a result of the matched curvature or bend of the grip pipe receptacle 67 and of the bend 65 of the grip pipe 4, a positive fit fixation of the holding device 60 on the grip pipe 4 results.

Figure 22:
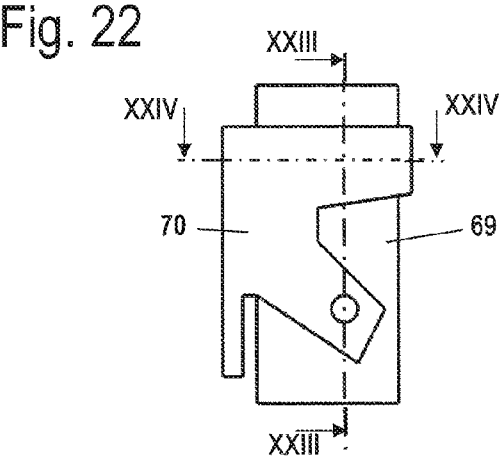
FIG. 22 is a plan view onto one embodiment of a holding device on the grip pipe.
Figure 23:
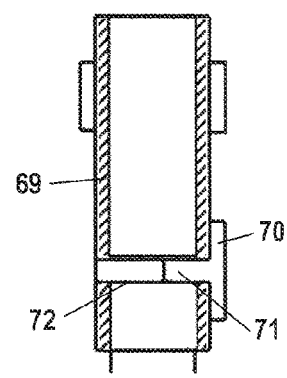
FIG. 23 is a section view along the section line XXIII-XXIII of FIG. 22.

FIGS. 22 to 24 show schematically a further embodiment of a holding device 70. The holding device 70 is secured on a grip pipe 69 that extends straight and has an approximately rectangular cross-section. For fixation of the position of the holding device 70 on the grip pipe 69, the grip pipe 69 has a through bore 72 into which projects a pin 71 of the holding device 70. In the illustrated embodiment, the pin 71 is formed integrally on the holding device 70. The pin 71 however can also be a separate component that is to be secured on the holding device 70.

FIG. 24 shows also the arrangement of guide 29 on the holding device 70. The embodiment of the holding device 70 with regard to other features corresponds to that of the holding device 8 shown in FIGS. 1 through 18. As shown in FIG. 24, the holding device 70 has a grip pipe receptacle 77 having a shape matched to the cross-section of the grip pipe 69. The grip pipe receptacle 77 has a width b that matches the width c of the grip pipe 69. The opening 28 on the grip pipe receptacle 77 has a width f that corresponds at least to the width c of the grip pipe 69. The height d of the grip pipe receptacle 77 matches at least the height e of the grip pipe 69. Advantageously, the grip pipe 69 is secured with little play or without play in the grip pipe receptacle 77.

FIGS. 25 and 26 show an embodiment of the indicator 79 that has an adjusting device 78 for a line laser that is not shown in detail. For fixation on a holding device 8, 60, 70, the indicator 79 has a receptacle 37. The adjusting device 78 comprises a wheel 82 that is rotatable about axis of rotation 14 in the housing 80 of the indicator 79. The wheel 82 has a window 81 through which the light of the line laser can shine.

In the embodiments according to FIGS. 25 and 26, the wheel 82 is supported between two sections of the housing 80. FIGS. 27 and 28 show an indicator 89 whose configuration matches substantially that of the indicator of FIGS. 25 and 26. However, the indicator 89 has an adjusting device 88 that is placed onto the housing 90 of the indicator 89 and is rotatably supported thereon about axis of rotation 14. The adjusting device 88 has a wheel 92 that is provided on its outer circumference with a window 91 for the line laser. On the topside of the wheel 92 a marking 93 is provided that indicates in which direction the line laser shines through the window 91.

FIG. 29 shows the configuration of the adjusting device 88 in detail. The adjusting device 78 of FIGS. 25 and 26 can be designed substantially identically wherein the wheel 82 may be open at both sides.

As shown in FIG. 29, a laser diode 95 is secured in the wheel 92. For this purpose, the wheel 92 has a receptacle 97 that engages laser diode 95 on its circumference. For axial fixation a stop 96 is provided. On the opposite side, the laser diode 95 abuts the window 91 or a part adjacent to the window 91. For alignment of the laser diode 95 the wheel 92 has, adjacent to the window 91, several centering stays 98 that secure the position of laser diode 95 in the wheel 92. The wheel 92 has two threaded support sleeves 94 by means of which the wheel 92 is connected with fastening screws, not shown, to a securing plate that is also not illustrated. In order to enable rotation of the wheel 92 on the housing 90, the wheel 92 has a lateral rim 87 that has at least one groove 86 with which the wheel 92 is rotatably supported on the housing 80.

It may also be provided that a control unit 54 for the laser diode 95 is arranged in the wheel 92. In the illustrated embodiment, the control unit 54 is arranged in the housing 90 of the indicator 89 and by means of electric cables, not shown, connected to the laser diode 95. A simple configuration results by integration of the laser diode 95 into the adjusting device 88. The holding devices 60 and 70 correspond in regard to other features of their configuration, not illustrated or described in detail, substantially to the holding device 8.

Figure 30:
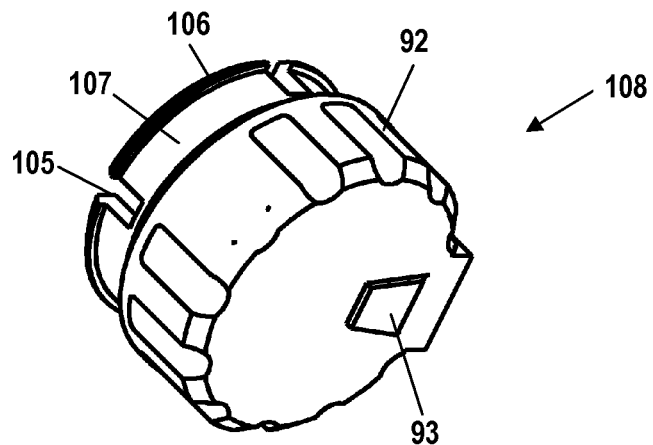
FIG. 30 is a perspective illustration of an embodiment of an adjusting device.
Figure 31:
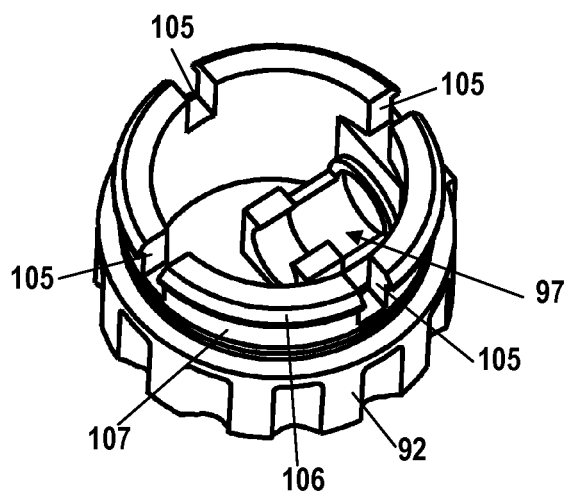
FIG. 31 is a perspective illustration of an embodiment of an adjusting device.
Figure 32:
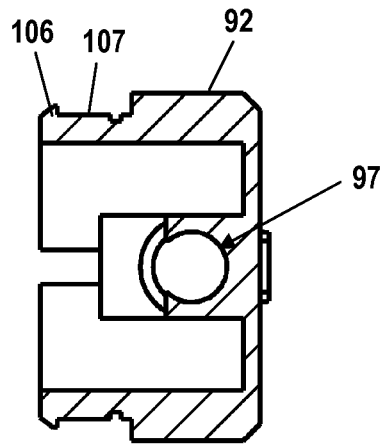
FIG. 32 is a section of the adjusting device of FIGS. 30 and 31.

FIGS. 30 to 32 illustrated an embodiment of an adjusting device 108. The adjusting device 108 has a wheel 92 whose configuration corresponds substantially to that of the wheel 92 illustrated in FIGS. 27 to 29. Same reference numerals indicate identical elements. The adjusting device 108 is not connected by positive fit with screws to the housing 80, as in case of the adjusting device 88, but by means of a snap-on connection. For this purpose, on the wheel 92 a rim 107 is integrally formed that has a radially projecting locking projection 106. The locking projection 106 extends substantially about the entire circumference of the wheel 107. In order to enable a radial springiness of the locking projection 106, the rim 107 has four slots 105 that divide the rim 107 into four identical sections. In the wheel 92 a receptacle 97 for the laser diode 95 is provided.

The specification incorporates by reference the entire disclosure of German priority document 10 2010 008 102.7 having a filing date of Feb. 15, 2010.

While specific embodiments of the invention have been shown and described in detail to illustrate the inventive principles, it will be understood that the invention may be embodied otherwise without departing from such principles.

What is claimed is:

1. A power tool comprising:
an indicator comprising a light source for generating a marking;
a holding device;
wherein said indicator is releasably secured on said holding device;
a grip pipe having a first section and a second section in a longitudinal direction of said grip pipe, wherein said grip pipe has a bend between said first and second sections in said longitudinal direction, said bend connecting said first and second sections;
wherein said holding device is secured by positive fit on said bend of said grip pipe;
wherein said holding device has a grip pipe receptacle having a shape matched to a shape of said bend of said grip pipe such that said holding device is securable in only one constructively predetermined position on said grip pipe.

2. A power tool comprising:
an indicator comprising a light source for generating a marking;
a holding device secured on the power tool by positive fit;
wherein said indicator is releasably secured on said holding device;
wherein said indicator has an adjusting device for adjusting said marking;
wherein said indicator comprises a line laser that generates said marking in a line shape;
wherein the power tool is a motor chainsaw with a guide bar and a gun sight, wherein said line-shaped marking is positioned in a plane that is perpendicular to a plane of said guidebar and perpendicular to a bottom side of said motor chainsaw, wherein said plane in which said line-shaped marking is positioned extends parallel to said gun sight;
wherein said line laser is adjustable such that a spacing of an end point of said marking to said plane of said guidebar within a plane of said bottom side of said motor chainsaw is adjustable from at least approximately 20 cm to approximately 110 CM.

3. The power tool according to claim 2, comprising a grip pipe on which said holding device is secured by said positive fit.

4. The power tool according to claim 3, wherein said grip pipe has a cross-section deviating from a circular shape and wherein said holding device has a grip pipe receptacle having a cross-section matched to said cross-section of said grip pipe.

5. The power tool according to claim 4, wherein said grip pipe receptacle has an opening having a width corresponding approximately to a smallest diameter of said grip pipe.

6. A motor chainsaw comprising:
a guide bar;
a gun sight;
an indicator comprising a light source for generating a marking;
a holding device secured on the motor chainsaw by positive fit;
wherein said indicator is releasably secured on said holding device;
wherein said indicator has an adjusting device for adjusting said marking;
wherein said indicator comprises a line laser that generates said marking in a line shape;
wherein said line-shaped marking is positioned always in a plane that is perpendicular to a plane of said guidebar and perpendicular to a bottom side of said motor chainsaw, wherein said plane in which said line-shaped marking is positioned extends parallel to said gun sight;
wherein said line laser is supported to be rotatable about an axis of rotation, wherein said axis of rotation is parallel to said bottom side of said motor chainsaw so that upon adjustment of said line laser about said axis of rotation said line-shaped marking is moving in said plane.

7. The motor chainsaw according to claim 6, wherein said plane in which said line-shaped marking is positioned has a spacing to said gun sight, said spacing being smaller than approximately 5 cm.

8. The motor chainsaw according to claim 6, wherein said line laser has a laser diode, wherein said indicator has a housing in which said laser diode is rotatably supported for adjusting said line-shaped marking, and wherein an axis of rotation of said laser diode extends approximately parallel to a longitudinal center axis of said guidebar.

9. The motor chainsaw according to claim 8, wherein said housing has a slot-shaped window through which said laser diode shines for generating said marking.

10. The motor chainsaw according to claim 8, wherein said indicator has an adjusting device for said laser diode and wherein said laser diode is integrated into said adjusting device.

11. The motor chainsaw according to claim 6, further comprising:

a grip pipe on which said holding device is secured by said positive fit;

wherein said holding device has a holding device geometry that is matched to a grip pipe geometry of said grip pipe such that said holding device is securable in only one predefined position on said grip pipe;

wherein said holding device has a pin as a part of said holding device geometry and said grip pipe has a recess as a part of said grip pipe geometry, wherein said recess is engaged by said pin of said holding device with said pin projecting into said grip pipe to provide said positive fit.

12. The motor chainsaw according to claim 11, wherein said indicator is releasably secured on said holding device by a snap-on connection, wherein said snap-on connection has an actuating device for releasing said snap-on connection.

13. The motor chainsaw according to claim 11, wherein said holding device has a guide onto which said indicator is pushed.

\* \* \* \* \*